Jan. 9, 1940.  H. C. CARTER  2,186,405
STOKER DRIVE MECHANISM
Filed May 16, 1938  3 Sheets-Sheet 1
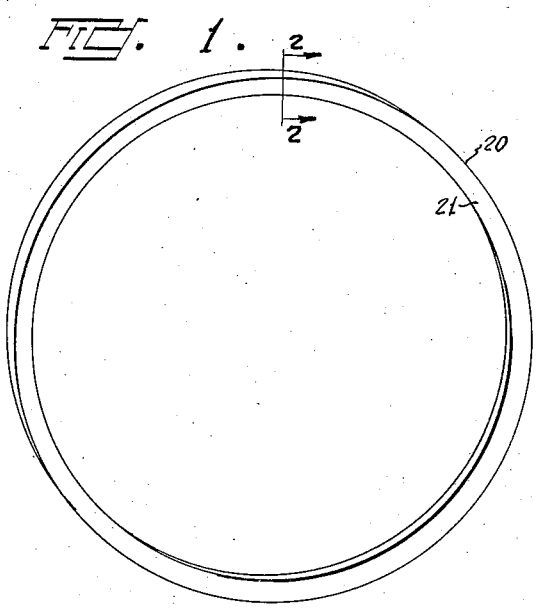
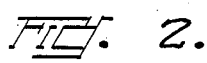
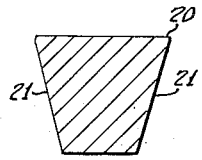
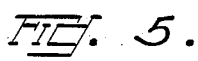
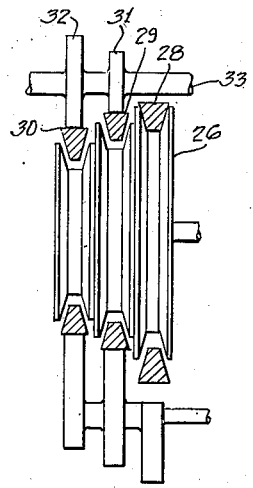
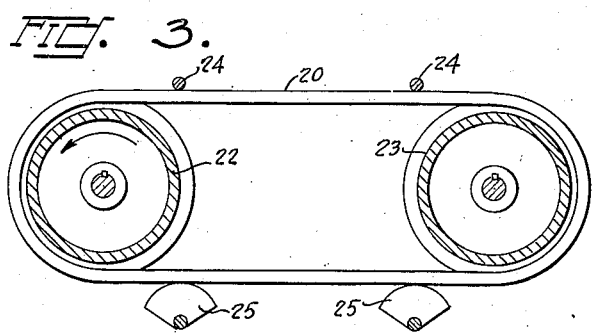
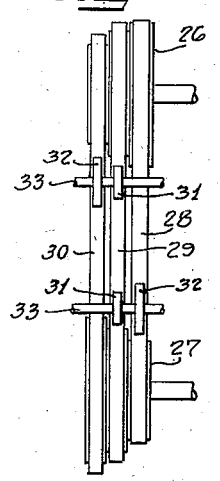
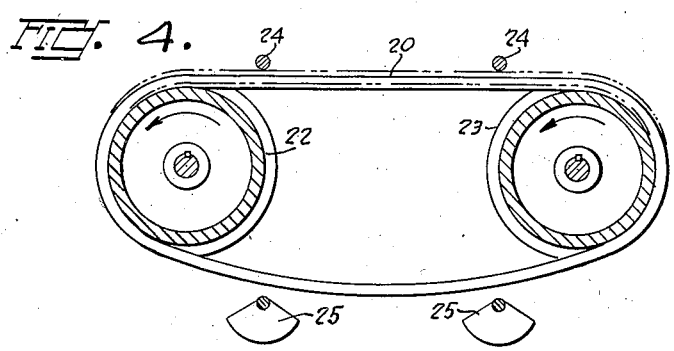
INVENTOR
H. C. CARTER
BY
ATTORNEY Jan. 9, 1940.   H. C. CARTER   2,186,405
STOKER DRIVE MECHANISM
Filed May 16, 1938   3 Sheets-Sheet 2
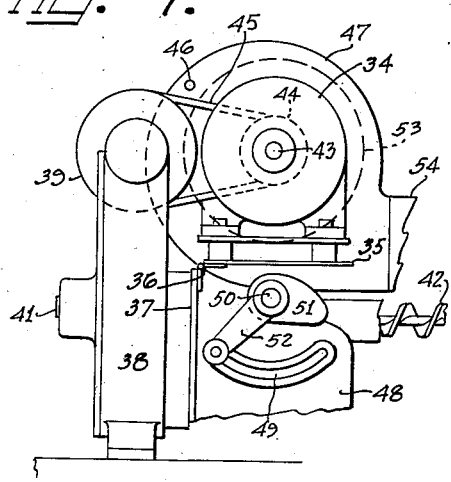
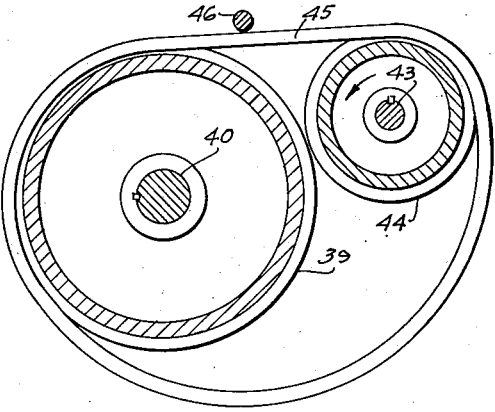
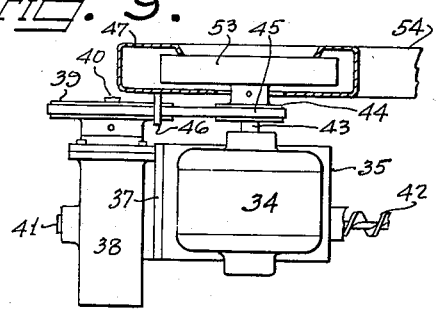
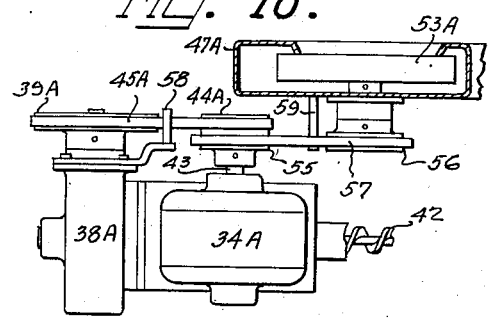
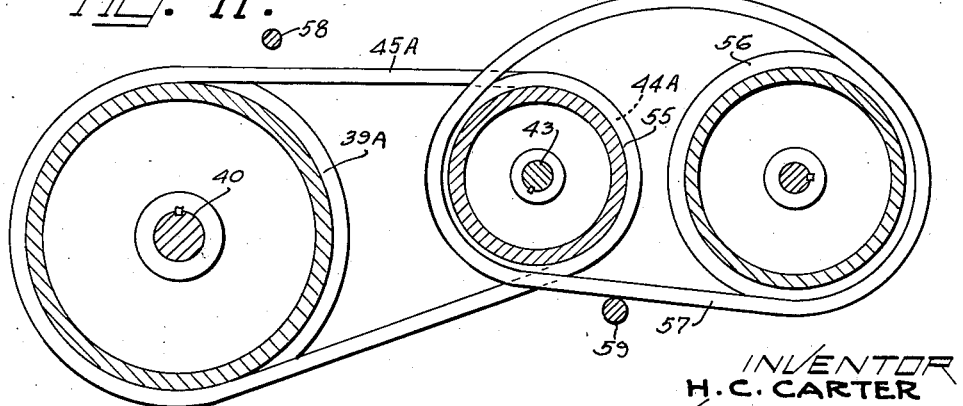
INVENTOR
H. C. CARTER
ATTORNEY Jan. 9, 1940.   H. C. CARTER   2,186,405
STOKER DRIVE MECHANISM
Filed May 16, 1938   3 Sheets-Sheet 3
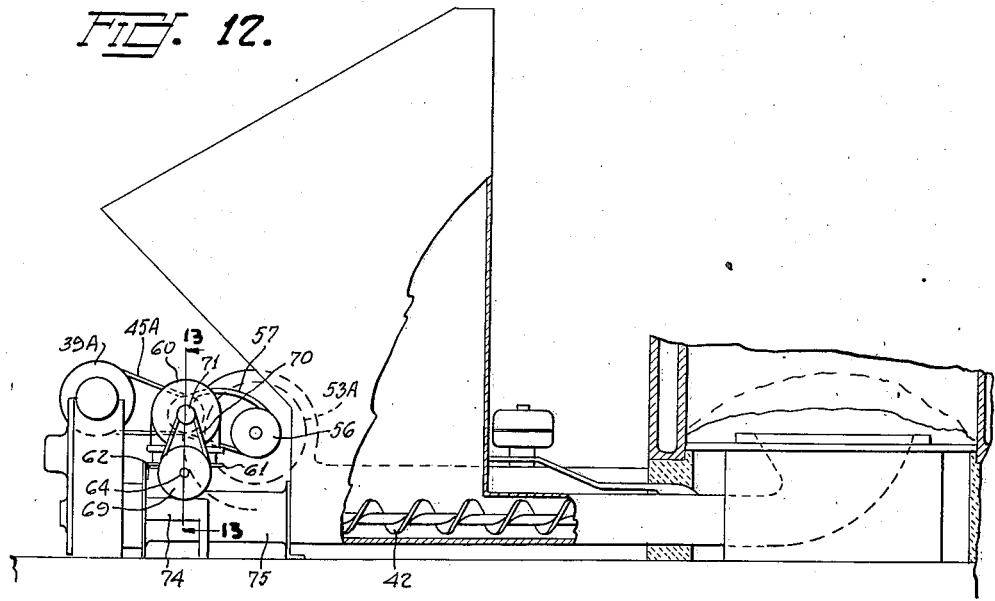
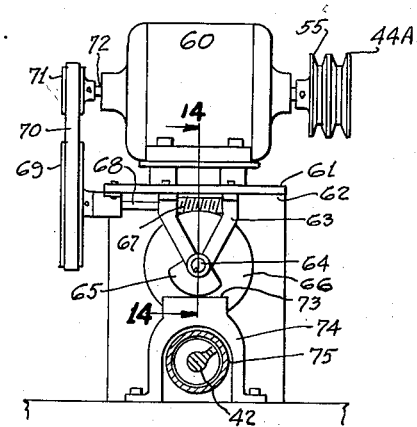
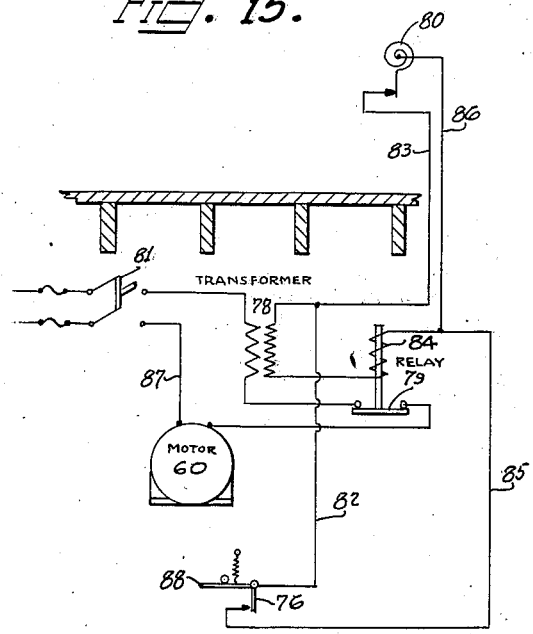
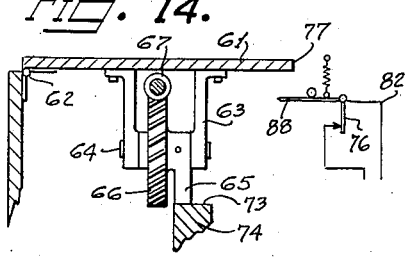
INVENTOR
H. C. CARTER
ATTORNEY Patented Jan. 9, 1940

2,186,405

UNITED STATES PATENT OFFICE 2,186,405

STOKER DRIVE MECHANISM

Haskell C. Carter, Portland, Oreg., assignor to Iron Fireman Manufacturing Company, Portland, Oreg.

Application May 16, 1938, Serial No. 208,167

1 Claim. (Cl. 74—242.8)

This invention relates generally to stokers, and particularly to a stoker drive mechanism.

The main object of this invention is to construct a stoker drive mechanism by means of which a driving action may be applied to a coal feeding worm and to a fan alternately if desired without the necessity of employing expensive and complicated mechanisms.

The second object is to provide a simple and effective form of drive in which advantage is taken of the tendency of a belt to assume a circular form when in motion.

The third object is to construct a stoker for use in connection with coking coals whereby the deliveries of coal and air are alternated in order to prevent the formation of coke columns.

These and other objects are accomplished in the manner set forth in the following specification as illustrated in the accompanying drawings, in which:

Fig. 1 is a perspective view of a V-belt showing the form it tends to assume in motion.

Fig. 2 is a section taken along the line 2—2 in Fig. 1.

Fig. 3 is a diagrammatic sectional view showing a belt held away from the natural running position.

Fig. 4 is a view similar to Fig. 3 showing the belt in a driving position.

Fig. 5 is a sectional view through a modified form of the device showing two sets of operating cams.

Fig. 6 is a plan of the form of the device shown in Fig. 5.

Fig. 7 is a side elevation of a modified form of the device employed in connection with a close center drive.

Fig. 8 is a sectional diagram of a pair of pulleys showing the shape of the belt when the center distance between the pulleys is shortened.

Fig. 9 is a plan of Fig. 7 showing the fan casing broken away in section.

Fig. 10 is a plan of an alternate form of the device showing two driven pulleys.

Fig. 11 is a diagrammatic sectional view showing the drive illustrated in Fig. 10 and in which the motor is shifted in the manner illustrated in Fig. 7.

Fig. 12 is a side elevation of an underfeed stoker showing parts broken away in section to disclose the coal feeding worm and showing the fan in an idle position.

Fig. 13 is a section taken along the line 13—13 in Fig. 12 showing the fan in a running position.

Fig. 14 is a section taken along the line 14—14 in Fig. 13 showing the fan in a running position.

Fig. 15 is a wiring diagram showing the control for the stoker.

Similar numerals refer to similar parts throughout the several views.

Referring in detail to the drawings, there is shown in Fig. 1 a common form of V-belt 20 which is moulded in circular form and which has the sides 21 of its pulley engaging portion converging. The belt 20 passes around the groove pulleys 22 and 23. Pins 24 are disposed on one side of the pulleys 22 and 23 and the cams 25 are mounted on the opposite sides of the pulleys 22 and 23 and are in alinement with the belt 20.

It can be seen in Fig. 3 when the cams 25 engage the belt 20, they hold it against two pins 24 and out of engagement with the pulleys 22 and 23. When the cams 25 are turned to the positions shown in Fig. 4, one side of the belt 20 is permitted to curve outwardly causing the belt 20 to move away from the pins 24 and to enter into a driving relationship with the pulleys 22 and 23.

In Figs. 5 and 6 are shown the stepped pulleys 26 and 27 around which are placed the belts 28, 29 and 30. In this form of the device it is desirable to provide rollers 31 and 32 on the shafts 33 which take the place of the pins 24. It will be noted that only two rollers are required on each shaft 33 since the shaft itself serves as a stop on the belts 28 and 30.

In the form of the device shown in Fig. 7, there is shown a motor 34 which is mounted on a base 35 which is attached by a hinge 36 to the plate 37 which is secured to the gear case 38. Within the gear case 38 is a reduction gearing (not shown). Power is transmitted to the gearing contained within the casing 38 through a pulley 39 which is mounted on the shaft 40 and delivered from said reduction gearing to the shaft 41 of the coal feeding worm 42. On the shaft 43 of the motor 34 is mounted a pulley 44. A V-belt 45 passes around the pulleys 39 and 44. A pin 46 is mounted on the side of the fan casing 47. The pin 46 projects across the V-belt 45 and does not contact same when it is in a driving position.

Secured to the plate 37 is a bracket 48 which is provided with an arcuate slot 49. The shaft 50 journals in the bracket 48 and has mounted thereon a cam 51 which can engage the base 35 of the motor 34. A lever 52 is mounted on the shaft 50 and is used to control the position of the cam 51. The fan 53 is mounted on the shaft 43 and is confined within the casing 47 which communicates with the air duct 54.

It will be seen in Fig. 8 that when the centers of the pulleys 39 and 44 are brought together that the V-belt 45 engages the pin 46 and causes same to straighten and to move out of a driving relationship.

In the form of the device shown in Fig. 10, which is otherwise identical with the form shown in Fig. 9, a separate pair of pulleys 55 and 56 and a belt 57 are used to drive the fan 53A from the motor 34A and a pin 58 is mounted on the gear case 38A while the pin 59 is mounted on the fan casing 47A. The operation of this form of the device is shown clearly in Fig. 11 wherein if the center of the motor 34A is lowered as shown, the belt 57 will contact the pin 59 moving the belt 57 out of engagement with the pulleys 55 and 56 while the belt 45A is now in a driving relationship with the pulleys 39A and 44A. It can thus be seen that if the motor 34A is raised, the fan 53A will be driven, while if it is lowered as shown in Fig. 11 the coal feeding worm 42 will be driven.

In the form of the device shown in Figs. 12 to 15, the motor 60 is mounted upon a base 61 which is supported on one side by a hinge 62 and on the other side by means of a bracket 63 on the lower end of which is mounted a cam shaft 64 on which is secured a cam 65 and a worm wheel 66 which meshes with the worm 67 whose shaft 68 journals in the bracket 63.

On the shaft 68 is secured a pulley 69 whose belt 70 passes around the pulley 71 on the motor shaft 72. On the motor shaft 72 are mounted the pulleys 44A and 55.

The cam 65 rests upon the top 73 of the standard 74 which straddles the coal conveying tube 75 within which is disposed the coal feeding worm 42. It can be seen that as the motor 60 is operated, it is also rocked by the action of the cam 65 and as it is rocked, it transfers the driving action alternately between the fan 53A and the coal feeding worm 42.

It can be seen in Fig. 15 that there is employed a switch 76 which is opened by the downward action of the end 77 of the base 61. There is also indicated a transformer 78, a relay 79, and a thermostat 80. A manually controlled switch 81 is interposed between the transformer 78 and the motor 60. It will be noted that the switch 76 is connected by a wire 82 to one thermostat wire 83 which is connected with the transformer 78 which in turn is connected by means of the wire 85 to the switch 76 and by means of the wire 86 to the thermostat 80. The motor 60 is connected by means of the wire 87 to the switch 81.

It will be seen in Fig. 14 that when the plate 37 is lowered, it contacts the arm 88 of the switch 76 causing it to open.

The operation of the device as shown diagrammatically in Fig. 10 is as follows:

Assuming that the thermostat 80 is closed, that is, calling for heat, then the relay coil 84 is energized and the relay switch 79 is closed. This will permit the motor 60 to operate whether or not the switch 76 is closed.

It will also be noted that if the switch 76 is closed, the motor 60 will operate whether or not the thermostat 80 is open or closed. However, if both the thermostat 80 and the switch 76 are open at the same time, the motor 60 will not operate under this condition.

During the time the motor 60 is operating, it alternately drives the fan 53A and the coal feeding worm 42, as shown in Fig. 10, or it drives the fan 53 continuously and the coal feeding worm 42 intermittently as shown in Fig. 9.

By utilizing the characteristic of a V-belt to assume a circular form, I have made it possible to provide a very flexible driving system for stokers and one which is especially adaptable for use in connection with the intermittent operation of the coal feeding worm.

I claim:

A driving mechanism consisting of a driving pulley, a driven pulley associated therewith, a V-belt passing around said pulleys, said belt having excessive length, means for holding opposite sides of said belt straight for the purpose of holding said belt out of contact with said pulleys, one of said means being retractable and adapted to permit its side of the belt to assume a curved form when said belt is contacting said pulleys.

HASKELL C. CARTER.